Dec. 8, 1925.  1,564,509
S. A. BERGLUND
APPARATUS FOR REPRODUCING SOUNDS PHOTOGRAPHICALLY RECORDED ON A FILM
Filed April 25, 1923
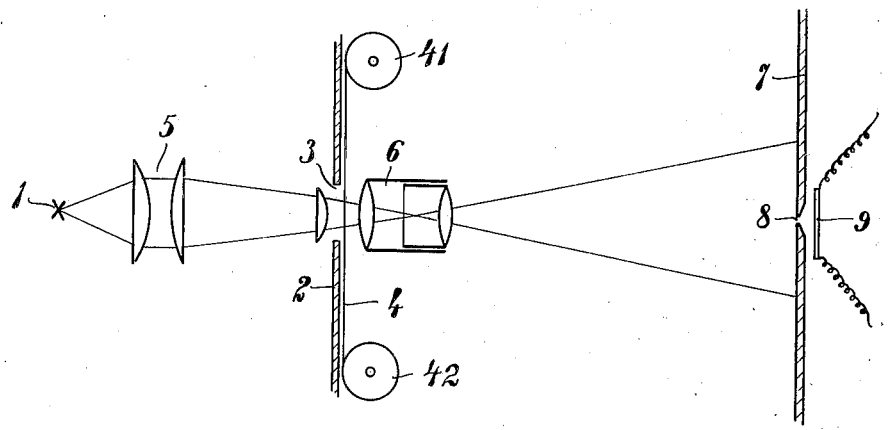

Patented Dec. 8, 1925.

1,564,509

UNITED STATES PATENT OFFICE.

SVEN A:SON BERGLUND, OF STOCKHOLM, SWEDEN.

APPARATUS FOR REPRODUCING SOUNDS PHOTOGRAPHICALLY RECORDED ON A FILM.

Application filed April 25, 1923. Serial No. 634,523.

*To all whom it may concern:*

Be it known that I, SVEN A:SON BERGLUND, a citizen of the Kingdom of Sweden, residing at Stockholm, Sweden, have invented new and useful Improved Apparatus for Reproducing Sounds Photographically Recorded on a Film, of which the following is a specification.

This invention relates to an improved apparatus for reproducing sounds photographically recorded on a film.

It is well-known to record sound waves in such manner that a cone of rays varying in accordance with the sound waves is brought to act upon a continuously moved film which is sensitive to light and to reproduce such recorded sound waves by continuously moving the film behind a narrow slit in a wall and sending through said slit a cone of rays through the film and against a cell sensitive to light, which is connected into an electric circuit in which on account of the varying light to which the cell is exposed variations of the intensity of the electric current are caused corresponding to the recorded sound waves by means of which a telephonic apparatus, preferably a loud speaker, is directly or indirectly acted upon for reproducing the sounds recorded on the film.

I have found that the sounds reproduced will be clearer the narrower the slit through which the film is exposed to light in reproducing the recorded sound waves. The possibility of reducing the width of the slit is however limited by the disturbing interference phenomenon which arises when the light rays are passing through very narrow slits and in fact it is not possible to obtain a fully clear reproducing of the recorded sounds by reducing the width of the slit to the limit where the interference phenomenon begins perceptibly to disturb the reproduction.

The object of the present invention is to provide means by which it will be possible to avoid said drawback and make it possible to obtain fully clear sounds in reproducing the recorded sound waves.

The invention consists, chiefly, in the combination of cinematographic means for projecting a continuously moving magnified image of the film record with a screen for taking up said magnified image and containing a narrow slit transverse in relation to the sound waves of the projected image, and a cell sensitive to light behind said slit and connected into an electric circuit. When the slit in the screen is made of the slightest width that is possible without disturbing interference the sensitive cell will on account of the magnification of the image be acted upon at every moment of a very short part of the sound waves record whereby the variations of the intensity of the electric current flowing through the cell will very closely follow the form of the recorded sound waves and accordingly enable a clear reproduction.

In the accompanying drawing I have diagrammatically shown one embodiment of my invention.

Referring to the drawing, 1 is a suitable source of light, as for instance an arc lamp, 2 a wall having an opening 3 behind which the film 4 containing the recorded sound waves can be continuously moved by any suitable means indicated in the drawings by the rollers 41 and 42. By suitable lens systems 5 and 6 of essentially the same arrangement as in cinematographs the rays from the source of light 1 are directed through the opening 3 and the film 4 against a screen 7 whereby a continuously moving magnified image of that part of the film which at every moment covers the opening 3 is obtained on the screen 7. In said screen a narrow transverse slit 8 is provided behind which a cell 9 sensitive to light, as for instance a selenium cell, is disposed. Said cell will accordingly be lightened by the light passing through the narrow slit 8 which corresponds to a very short length of the film 4 and its sound waves record. Said cell is connected into an electric circuit containing suitable means for reproducing the sound, preferably a loud speaking telephone apparatus (not shown in the drawing).

What I claim is:—

Apparatus for reproducing sounds recorded photographically on a film, comprising a cinematograph having means for continuously feeding the film and adapted to produce a magnified image of the film record, a screen for taking up said image disposed at a distance from the cinematograph and having a transverse narrow slit through which a part of the light rays pass, a cell sensitive to light behind said slit and connected into an electric circuit containing means for reproducing sounds in accordance with the variations of current produced in said circuit by the light rays striking the cell.

In testimony whereof I have signed my name.

SVEN A:SON BERGLUND.